(12) United States Patent
Bax et al.

(10) Patent No.: US 10,223,477 B2
(45) Date of Patent: *Mar. 5, 2019

(54) RECOMMENDED QUERY FORMULATION

(71) Applicant: Excalibur IP, LLC, Sunnyvale, CA (US)

(72) Inventors: Eric Bax, Sierra Madre, CA (US); John Peng, Arcadia, CA (US); Scott Ard, Pleasanton, CA (US); Arun Autuchirayll, Burbank, CA (US)

(73) Assignee: Excalibur IP, LLP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,422

(22) Filed: Jun. 26, 2017

(65) Prior Publication Data

US 2017/0293699 A1    Oct. 12, 2017

Related U.S. Application Data

(63) Continuation of application No. 14/320,255, filed on Jun. 30, 2014, now Pat. No. 9,690,860.

(51) Int. Cl.
*G06F 17/30* (2006.01)

(52) U.S. Cl.
CPC .... *G06F 17/30973* (2013.01); *G06F 17/3064* (2013.01); *G06F 17/3097* (2013.01); *G06F 17/30637* (2013.01); *G06F 17/30648* (2013.01); *G06F 17/30867* (2013.01); *G06F 17/30991* (2013.01); *G06F 17/30997* (2013.01)

(58) Field of Classification Search
CPC ......... G06F 17/30973; G06F 17/30867; G06F 17/30991; G06F 17/30997; G06F 17/3097; G06F 17/3064; G06F 17/30648; G06F 17/30637; G06F 17/30911; G06F 17/30

See application file for complete search history.

(56) References Cited

U.S. PATENT DOCUMENTS

| 8,055,675 | B2 | 11/2011 | Higgins |
| 8,255,521 | B1 | 8/2012 | Natarajan |
| 8,447,760 | B1 | 5/2013 | Tong |
| 2006/0026013 | A1* | 2/2006 | Kraft ................ G06F 17/30867 705/1.1 |
| 2006/0167857 | A1 | 7/2006 | Kraft |
| 2007/0203894 | A1 | 8/2007 | Jones |
| 2008/0140699 | A1 | 6/2008 | Jones |
| 2008/0154877 | A1 | 6/2008 | Joshi |

(Continued)

OTHER PUBLICATIONS

Diego Ceccarelli, Sergiu Gordea, Claudio Lucchese, Franco Maria Nardini and Gabriele Tolomei: "Improving Europeana Search Experience Using Query Logs" International Conference on Theory and Practice of Digital Libraries—TPDL 2011: Research and Advanced Technology for Digital Libraries pp. 384-395.

(Continued)

*Primary Examiner* — Anh Ly
(74) *Attorney, Agent, or Firm* — Berkeley Law & Technology Group, LLP

(57) ABSTRACT

Briefly, embodiments disclosed herein may relate to formulating recommended search queries. Search query recommendations may be based, at least in part, on multiple user searches performed at least in part in response to consumption of publicly available content, for example.

27 Claims, 6 Drawing Sheets

(56) References Cited

U.S. PATENT DOCUMENTS

| | | |
|---|---|---|
| 2008/0256061 A1 | 10/2008 | Chang |
| 2008/0263033 A1 | 10/2008 | Vailaya |
| 2009/0006192 A1 | 1/2009 | Martinez |
| 2009/0164400 A1* | 6/2009 | Amer-Yahia .......... G06Q 10/00 706/45 |
| 2009/0164897 A1* | 6/2009 | Amer-Yahia ..... G06F 17/30867 715/703 |
| 2009/0192983 A1 | 7/2009 | Elango |
| 2009/0193099 A1* | 7/2009 | Partridge .......... G06F 17/30867 709/219 |
| 2009/0248510 A1 | 10/2009 | Ahluwalia |
| 2009/0248666 A1 | 10/2009 | Ahluwalia |
| 2009/0259646 A1 | 10/2009 | Fujita |
| 2009/0281872 A1* | 11/2009 | Kalaboukis ............ G06Q 30/02 705/14.54 |
| 2009/0299991 A1* | 12/2009 | Zarzar Charur .... G06F 17/3064 707/E17.014 |
| 2010/0082658 A1 | 4/2010 | Athsani |
| 2010/0114928 A1 | 5/2010 | Bonchi |
| 2010/0114929 A1* | 5/2010 | Bonchi ............... G06F 17/3064 707/759 |
| 2010/0241647 A1* | 9/2010 | Ntoulas ............. G06F 17/30528 707/765 |
| 2010/0250578 A1* | 9/2010 | Athsani ............ G06F 17/30867 707/765 |
| 2010/0318607 A1 | 12/2010 | Tamiya |
| 2010/0325646 A1 | 12/2010 | Alhadeff |
| 2011/0066618 A1 | 3/2011 | Sigurbjornsson |
| 2011/0125783 A1* | 5/2011 | Whale ............... G06F 17/30011 707/769 |
| 2011/0145229 A1 | 6/2011 | Vailaya |
| 2011/0213761 A1* | 9/2011 | Song ................. G06F 17/30867 707/706 |
| 2011/0276564 A1 | 11/2011 | Vailaya |
| 2012/0005626 A1 | 1/2012 | Wong |
| 2012/0078936 A1* | 3/2012 | Kuo .................. G06F 17/30867 707/766 |
| 2012/0124070 A1* | 5/2012 | Mishra ............. G06F 17/30528 707/767 |
| 2012/0158622 A1* | 6/2012 | Mital ..................... G06Q 50/01 706/12 |
| 2012/0158755 A1* | 6/2012 | Gammill .......... G06F 17/30044 707/754 |
| 2012/0166438 A1 | 6/2012 | Wu |
| 2012/0209834 A1 | 8/2012 | Vailaya |
| 2012/0209839 A1* | 8/2012 | Andrews ................ G06Q 10/10 707/728 |
| 2013/0031106 A1 | 1/2013 | Schechter |
| 2013/0073382 A1 | 3/2013 | Henkin |
| 2013/0086057 A1 | 4/2013 | Harrington |
| 2013/0110863 A1 | 5/2013 | Lai |
| 2013/0110872 A1 | 5/2013 | Barge |
| 2013/0110978 A1* | 5/2013 | Gordon .............. H04N 21/2665 709/218 |
| 2014/0280079 A1* | 9/2014 | Jain ..................... G06F 17/3053 707/723 |
| 2015/0006492 A1* | 1/2015 | Wexler .............. G06F 17/30554 707/694 |

OTHER PUBLICATIONS

Diego Ceccarelli: "When entities meet query recommender systems: semantic search shortcuts" Proceeding SAC '13 Proceedings of the 28$^{th}$ Annual ACM Symposium on Applied Computing—pp. 933-938—Coimbra, Portugal—Mar. 18-22, 2013.

Hazen, Timothy, "Direct and Latent Modeling Techniques for Computing Spoken Document Similarity", MIT Lincoln Laboratory, Dec. 15, 2010, 6 pages.

Salton, Wong and Yang, "A Vector Space Model for Automatic Indexing", Communications of the ACM, vol. 18, No. 11, Nov. 1975. 8 pages.

Singh, Lakhmani, Mathur and Morwal, "Analysis of Anaphora Resolution System for English Language," International Journal on Information Theory (IJIT), vol. 3, No. 2, Apr. 2014, 7 pages.

U.S. Appl. No. 14/320,255 / Application as filed Jun. 30, 2014, 68 pages.

U.S. Appl. No. 14/320,255 / Filing Receipt, Jul. 14, 2014, 3 pages.

U.S. Appl. No. 14/320,255 / Notice of Publication, dated Dec. 31, 2015, 1 page.

U.S. Appl. No. 14/320,255 / Non-Final Rejection, dated Jun. 22, 2016, 18 pages.

U.S. Appl. No. 14/320,255 / Amendment/Req. Reconsideration-After Non-Final Reject, dated Sep. 22, 2016, 28 pages.

U.S. Appl. No. 14/320,255 / Final Rejection, dated Nov. 29, 2016, 20 pages.

U.S. Appl. No. 14/320,255 / Response After Final Action, dated Jan. 30, 2017, 23 pages.

U.S. Appl. No. 14/320,255 / After Final Consideration Program Decision, dated Feb. 21, 2017, 1 page.

U.S. Appl. No. 14/320,255 / Notice of Allowance and Fees Due, dated Jul. 21, 2017, 10 pages.

U.S. Appl. No. 14/320,255 / Issue Fee Payment, dated May 22, 2017, 1 page.

U.S. Appl. No. 14/320,255 / Issue Notification, dated Jun. 7, 2017, 1 page.

* cited by examiner

RECOMMENDED QUERY FORMULATION

CROSS REFERENCE TO RELATED APPLICATION

This application is a continuation of U.S. patent application Ser. No. 14/320,255 entitled "RECOMMENDED QUERY FORMULATION," filed Jun. 30, 2014 (now issued as U.S. Pat. No. 9,690,860 on Jun. 27, 2017), the contents of which are hereby incorporated by reference in their entirety.

BACKGROUND

Field

Subject matter disclosed herein may relate to formulating recommended search queries, such as based at least in part on multiple user searches at least in part in response to publication of digital content, for example.

Information

With networks, such as the Internet, gaining tremendous popularity, and with the vast multitude of content, such as pages and/or other documents and/or other media content and/or applications, becoming available to users, such as via the World Wide Web (web), it may be desirable to provide more efficient and/or more streamlined approaches to gather, organize and/or display content, such as digital content, that may be desired by and/or useful to a user, for example. Internet-type business entities, such as Yahoo!, for example, may provide a wide range of content such as applications and/or other digital content that may be made available to users via the Web. In some circumstances, challenges may be faced in determining which content, for example, to display, such as to a user via a web page. In addition, in some cases, a user may not be aware of content that may be available, and/or that may be of interest and/or relevant to the user.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
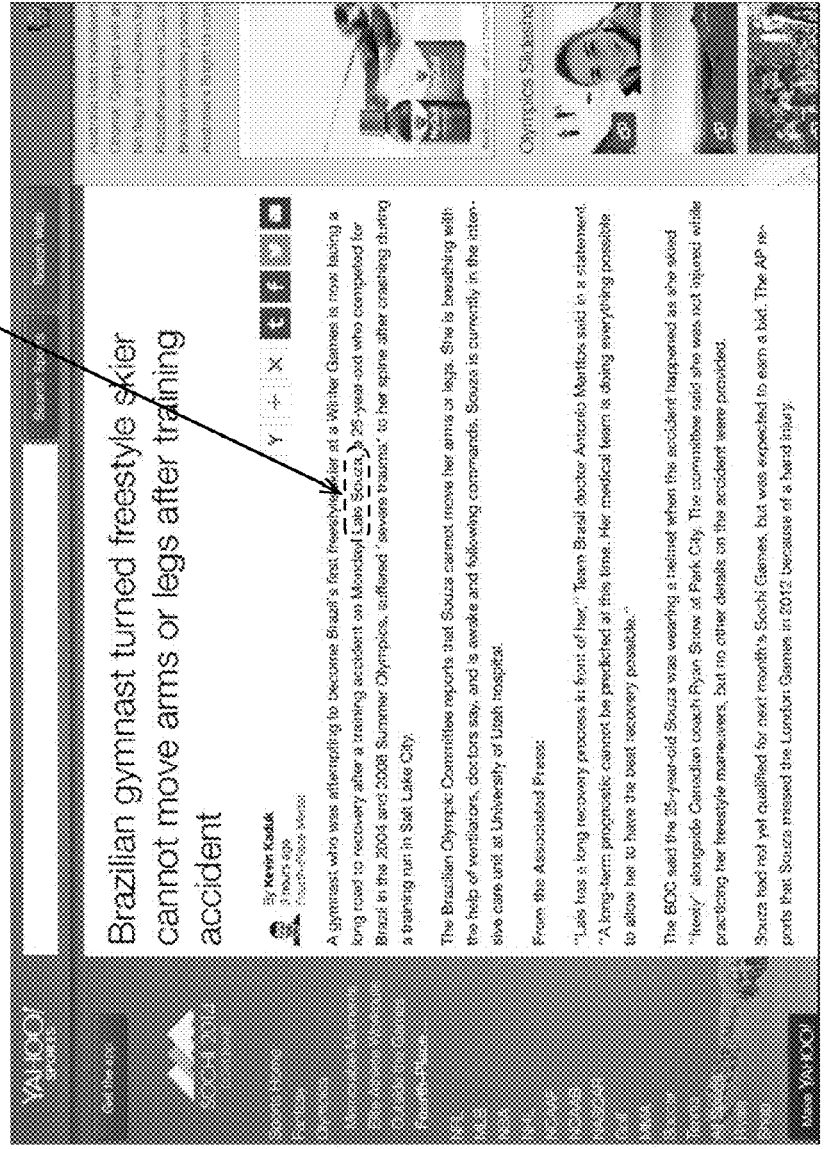
FIG. 1 is an illustration of an example web page including example digital content, according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context. Therefore, particular context of description and/or usage may provide helpful guidance regarding inferences to be drawn.

With advances in technology, it has become more typical to employ distributed computing approaches in which a computational problem may be divided among computing devices, including one or more clients and one or more servers, via a computing and/or communications network, for example.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms may be used generically. It should be understood that these terms are not intended as synonyms. Rather, "connected" if used generically may be used to indicate that two or more components, for example, are in direct physical, including electrical, contact; while, "coupled" if used generically may mean that two or more components are in direct physical, including electrical, contact; however, "coupled" if used generically may also mean that two or more components are not in direct contact, but may nonetheless co-operate and/or interact. The term coupled may also be understood generically to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality and/or some other combination of features, structures and/or characteristics. Likewise, the term "based on" and/or similar terms are understood as not necessarily intending to convey an exclusive set of factors and are intended to allow for existence of additional factors not necessarily expressly described, although particular context of description and/or usage may provide helpful guidance regarding inferences to be drawn. Though, it should be noted that this is merely an illustrative example and claimed subject matter is not limited to this example, again, particular context of description and/or usage may provide helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols), may interoperate within a larger network. In this context, the term sub-network refers to a portion and/or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet transmissions, for example, without a need for re-routing and/or redirecting network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. It is understood in this context that a private network may provide outgoing network communications to devices not in the private network, but such devices outside the private network may not necessarily direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel and/or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to the target address. Although the Internet comprises a network of interoperable networks, not all of those interoperable networks are necessarily available and/or accessible to the public.

Although physically connecting a network via a hardware bridge is done, a hardware bridge may not typically include a capability of interoperability via higher levels of a network protocol. A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol has several layers. These layers may be referred to here as a network stack. Various types of network transmissions may occur across various layers. For example, as one moves higher in a network stack, additional operations may be available by initiating network transmissions that are compatible and/or compliant with a particular network protocol at these higher layers. Therefore, for example, a hardware bridge may be unable to forward signal packets since it may operate at a layer of a network stack that does not provide that capability. Although higher layers of a network protocol may, for example, affect device permissions, user permissions, etc., a hardware bridge, for example, may typically provide little user control, such as for higher layer operations.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations. A network may be very large, such as comprising thousands of nodes, millions of nodes, billions of nodes, or more, as examples.

Although claimed subject matter is not in particular limited in scope to the Internet or to the web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language (XML) may also be utilized to specify content and/or format of hypermedia type content, such as in the form of a file or an "electronic document," such as a web page, in an embodiment. HTML and XML are intended to refer to any now known and/or later developed version of these languages. Likewise, claimed subject matter, of course, includes content that complies with and/or is compatible with such languages, in an embodiment. Of course, HTML and XML are merely examples provided as illustrations. Claimed subject matter is not intended to be limited to examples provided as illustrations, of course.

As used herein, a "web site" may refer to a collection of related web pages, in an embodiment. Also as used herein, "web page" may relate to any electronic file or electronic document, such as may be accessible via a network, by specifying a URL for accessibility via the web, in an example embodiment. As alluded to above, in one or more embodiments, a web page may comprise content coded using one or more languages, such as, for example, HTML and/or XML, although claimed subject matter is not limited in scope in this respect. Also, in one or more embodiments, application developers may write code in the form of JavaScript, for example, to provide content to populate one or more templates, such as for an application. JavaScript is intended to refer to any now known and/or later developed version of this programming language. However, JavaScript is merely an example programming language. As was mentioned, claimed subject matter is not limited to examples or illustrations.

As used herein, the term "entry", "electronic entry", "document", "electronic document", "content", "digital content", "item", and/or similar terms are meant to refer to signals and/or states in a format, such as a digital format, that may be perceived by a user if displayed, played and/or otherwise executed by a device, such as a digital device, such as, for example, a computing device, but otherwise may not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a web page coded in a markup language, such as, for example, HTML (hypertext markup language). In another embodiment, an electronic document may comprise a portion or a region of a web page. However, claimed subject matter is not limited in these respects. Also, for one or more embodiments, an electronic document and/or electronic entry may comprise a number of components. Components in one or more embodiments may comprise text, for example, as may be displayed on a web page. Also, for one or more embodiments, components may comprise a graphical object, such as, for example, an image, such as a digital image, and/or sub-objects, such as attributes thereof. In an embodiment, content may comprise, for example, text, images, audio, video, and/or other types of electronic documents and/or portions thereof, for example.

As mentioned, with networks, such as the Internet, gaining tremendous popularity, and with the vast multitude of pages and/or other documents and/or other content, such as media content, and/or applications, becoming available, such as to users, via the World Wide Web (web), for example, it may be desirable to provide more efficient and/or more streamlined approaches to gather, organize and/or display content, such as digital content, that may be desired by and/or useful to a user. Internet-type business entities, such as Yahoo!, for example, may provide a wide range of content such as applications, and/or other digital content that may be made available to users via the Web. In some circumstances, challenges may be faced in determining which content, for example, to display, such as to a user via a web page. In addition, in some cases, a user may not be aware of content that may be available, and/or that may be of interest and/or relevant to the user.

FIG. 1 is an illustration of an example web page 100 including example digital content, according to an embodiment. In some circumstances, at least in part in response to consuming, such as reading, an electronic document, such as digital content on web page 100, a user may desire to search for additional subject matter related to the subject matter of the electronic document. For example, a user may read an electronic document, such as, for example, a news article, such as depicted in example web page 100. At least in part in response to reading a news article, in this illustrative example, a user may desire to seek additional knowledge regarding a subject treated in a news article, for example. For the example depicted in web page 100, an article discusses a Brazilian gymnast named Lais Souza, referred to as example subject matter 110. For a situation in which a user desires to learn more about Ms. Souza, the user may formulate his or her own query, and may enter that query into a search bar, such as the example search bar depicted at the top of web page 100, for example. In response, a search engine, such as provided by Yahoo!, Inc., for example, may display a number of links to the user. The user may select one or more links, and may be led to additional materials related to the desired subject matter, in this example.

However, the example scenario described above may pose one or more potential problems. For example, it may involve some time and/or effort for a user to formulate his or her own queries, which may potentially be a disincentive to a user. Additionally, a user's ability to locate subject matter of interest may be limited by a user's skill and/or knowledge as it relates to formulating appropriate queries. For example, digital content may be available on one or more web pages related to a subject matter of interest to a user, but the user may unaware of availability. Likewise, a user may not understand how to generate a search query that would lead him or her to appropriate content. One or more embodiments, such as those described herein, may address, at least in part, these as well as other potential problems.

In an embodiment, content, such as digital content (e.g., an electronic document), may be published, such as on a web page. For example, an article, such as the article depicted on example web page 100 in FIG. 1, may be published at a point in time. As used herein, the term "publish" refers to "make public". Thus, to "publish" an article on a web page refers to making the web page, including the article, available to the public, such as via the World Wide Web, in an embodiment. Likewise, after being published, content, such as digital content, that has been published becomes "publically available." Typically, in response to publication of content, such as a news article on a web page, for example, users may begin to access the electronic document, and may start to seek additional content related to one or more subjects that may relate to the content of the electronic document, for example. In some situations, a user may formulate search queries, and may search for additional content on the web, for example.

In an embodiment, search queries generated by early users who may 'consume' a recently-published electronic document may be utilized, at least in part, to formulate recommended search queries for later users who consume the same published electronic document and/or for later users who may consume similar content, such as digital content. Here, for example, user consumption takes place by reading. In an embodiment, for example, one or more recommended search queries may be displayed to later users who consume the same and/or similar content. Also, in an embodiment, recommended search queries may be formulated, for example, at least in part by selecting queries from earlier users based, at least in part, on frequencies of occurrence among early users and/or on relevance to content, for example. By leveraging (e.g., utilizing) queries formulated by early users who, for example, consume a published electronic document, later users who consume the same and/or similar content may be more readily led to relevant and/or interesting content by way of one or more recommended search queries displayed to later users and/or selectable by later users, in an embodiment. In this manner, potential problems, such as those mentioned above, for example, may be addressed, at least in part. Later users may more readily find interesting and/or relevant content, and relative ease of locating content, such as in this manner, for example, may encourage additional online activity by later users. An approach, as previously discussed, for formulating recommended search queries may be referred to as "crowd-sourcing" recommended search queries, for example. "Crowd-sourcing", in general, may refer to obtaining services and/or content, at least in part, by obtaining contributions from a large group of people. As used herein, the term "crowd-sourcing" as it relates to recommended search query formulation, for example, may refer to gathering candidate search queries from a relatively large amount of early users, in an embodiment.

As used herein, the terms "query" and/or "search query" are meant to be interchangeable, and/or may refer to one or more textual terms that a user may provide to a search engine, such as via a client-server type interaction, for example, to institute a search for digital content related, at least in part, to the one or more textual terms.

Figure 2:
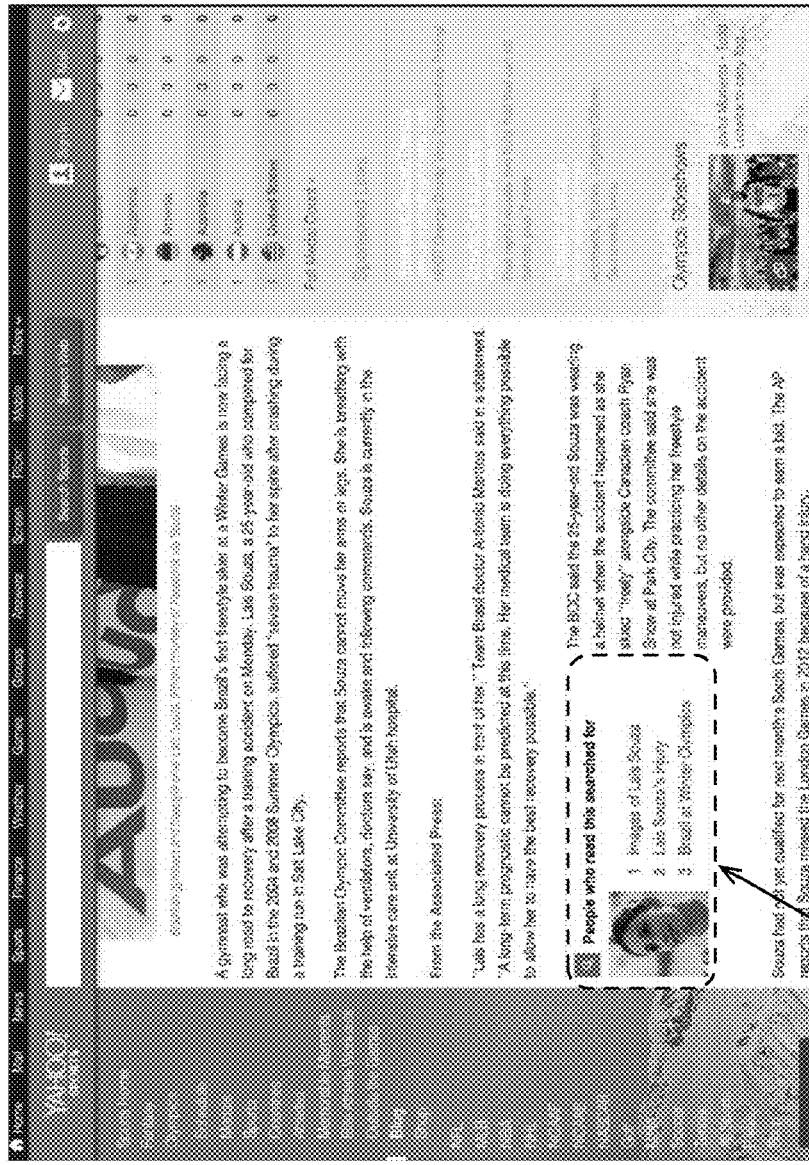
FIG. 2 is an illustration of an example web page display depicting example digital content and example search query recommendations, according to an embodiment.

FIG. 2 is an illustration depicting an example web page, such as example web page 100, and a plurality of example search query recommendations 120, according to an embodiment. As mentioned above, example web page 100 may comprise an example news article related to gymnast Lais Souza, although, of course, claimed subject matter is not limited in scope to this illustrative example. In an embodiment, the example news article may be published, such as depicted in FIG. 1. Also, in an embodiment, for a period of time following publication of a news article, search queries from a plurality of users determined to have accessed the news article may be monitored and/or stored. That is, in an embodiment, a plurality of search queries submitted by early users who may have consumed (e.g., read) example web page 100 may be monitored and/or stored. For example, an example server computing device may detect one or more users accessing an example web page, such as web page 100, and may monitor and/or store one or more search queries that may be submitted by the one or more users determined to have accessed the example web page.

Also, in an embodiment, an example server computing device may rank a plurality of search queries submitted by early content users. For example, a plurality of submitted search queries may be ranked according to frequency of occurrence among early content users who accessed example web page 100, in an embodiment. Also, in an embodiment, submitted search queries from early content users may be ranked, at least in part, according to relevance with respect to subject matter of example web page 100, such as relevance to Lais Souza, for example.

Additionally, in an embodiment, a set of example recommended search queries may be selected from among a plurality of search queries submitted by early content users, such as users who accessed example web page 100. For the example depicted in FIG. 2, a set of recommended search queries 120 may be selected, and may be displayed in an area of web page 100, in an embodiment. For example, as discussed in more detail below, a web page, such as example web page 100, may be generated based, at least in part, on a web page template that may be coded using one or more markup languages, such as, for example, HTML and/or XML. Additionally, an area of a web page template, such as an area to display a set of recommended search queries, for example, may comprise code, such as JavaScript, for example, that may be executed by a computing device to generate content for the area. For example, code associated with a web template area may be executed to generate a set of recommended search queries, such as recommended search queries 120, for example. In an embodiment, recommended search queries, such as recommended search queries 120, may be selected from among a larger subset of search queries submitted by early users, such as submitted by early content users who accessed example web page 100, for example. In an embodiment, selection of recommended search queries may be based, at least in part, on ranking, such as based at least in part on ranking by frequency of occurrence and/or by subject matter relevance, for example. Also, in an embodiment, recommended search queries may also be selected according to a diversity type operation, such as to help reduce duplicate and/or similar recommended search queries displayed to later users, for example. Further, although FIG. 2 depicts three recommended search queries 120, claimed subject matter is not limited in scope to illustrations, as previously discussed. For example, other embodiments may display five recommended search queries, and still other embodiments may display other numbers of recommended search queries.

In an embodiment, at least in part in response to viewing recommended search queries, such as recommended search queries 120, a user may read content from example web page 100, for example. A user, in an embodiment, may select one or more recommended search queries, such as one or more of recommended search queries 120, in an effort to, for example, find additional content related to web page content, such as related to the example Lais Souza news article, for example. Also, in an embodiment, at least in part in response to a user selecting a search query from a plurality of recommended search queries, such as recommended search queries 120, a search engine, such as provided by Yahoo!, Inc., for example, may perform a search at least in part in accordance with a selected recommended query. In an embodiment, a user may be directed to a search results page, for example, as discussed more fully below.

Figure 3:
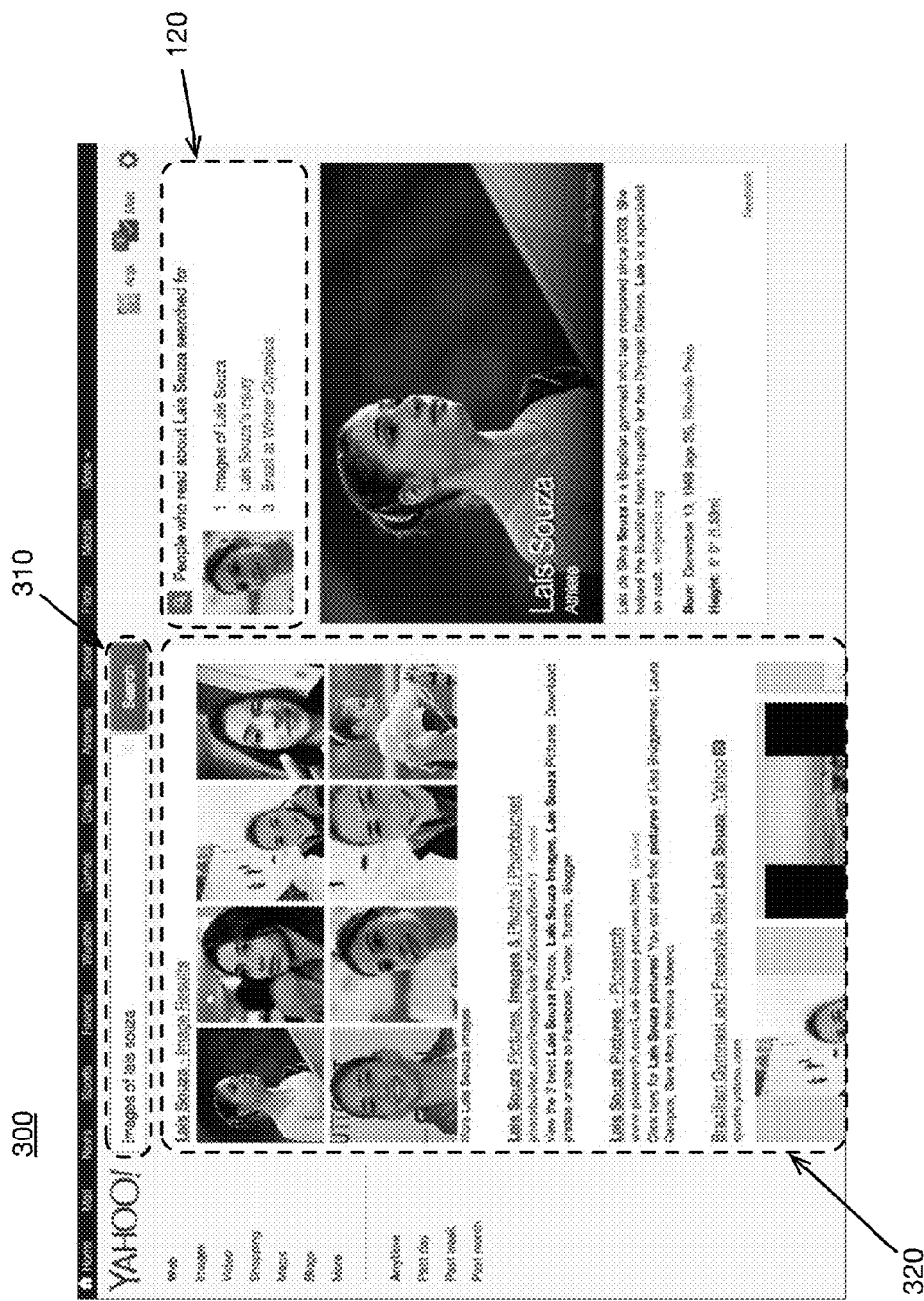
FIG. 3 is an illustration of an example web page display depicting an example search page including an area to display example search query recommendations, according to an embodiment.

FIG. 3 is an illustration of an example web page display depicting an example search results page 300 including an area 120 to display example search query recommendations, according to an embodiment. In an embodiment, area 120 of example search results page 300 may comprise the same and/or similar area 120 of example web page 100, although this is of course a non-limiting illustration. For example, in an embodiment, recommended search query area 120 may "follow" a user from a web page, such as web page 100, to a search results page, such as search results page 300. In this manner, a user may have a set of previously recommended search queries without returning to a previous web page, for example. Also, in an embodiment, a recommended search query area, such as area 120, for example, may follow a user to other subsequent web pages visited as a result of a user selecting a recommended search query, in an embodiment. For example, in an embodiment, a recommended search query, such as displayed in area 120, may comprise a hyperlink. Also, in an embodiment, at least in part in response to a user selecting a recommended search query hyperlink, a web search may be performed by a search engine, for example, and search results may be displayed to a user by way of a search results web page, such as search results page 300. In an embodiment, a search results web page, such as search results page 300, may comprise a template that may comprise one or more areas, such as recommended search query area 120. In an embodiment, an area of a search results page, such as recommended search query area 120 of search results page 300, may be populated with content generated by way of execution of code, such as JavaScript, for example, that may result in display of a set of recommended search queries to a user. Also, in an embodiment, code associated with recommended search query area 120 of search results page 300 may comprise code similar to code associated with area 120 of example web page 100, for example, although claimed subject matter is not limited in scope in this respect. Also, in an embodiment, an example template for an example search results page, such as search results page 300, may comprise code to identify a user, and/or, as mentioned above, may also comprise code to display a set of recommended search queries associated with an identified user. Also, in an embodiment, one or more example templates for one or more additional web pages may comprise code to identify a user and/or to display a set of recommended search queries associated with the user. In this manner, for example, a recommended search query area, such as recommended search query area 120 may appear to a user to "follow" the user from a web page, such as web page 100, to a search results page, such as search results page 300, and/or to "follow" the user from a web page, such as search results page 300, to one or more subsequent web pages, in an embodiment.

In an embodiment, a web page, such as web page 100 and/or search results page 300, may comprise a template including one or more areas in which, for example, content, such as digital content, may be displayed and/or otherwise executed, for example (e.g., consumable content may be provided). Thus, in an embodiment, search results page 300 may comprise a template including a plurality of areas, including recommended search query area 120. Other example areas of example search results page 300 may comprise example search header 310 and/or example search results area 320, in an embodiment. Of course, other embodiments may include fewer or greater numbers of areas, and/or may include any number of arrangements and/or configurations of areas. As used herein, the term "area," for example, as it is used with respect to a web page and/or, a web page template, may relate to a portion of a web page reserved, for example, to display and/or otherwise execute specified content. In an embodiment, a web page area may, as one example, have associated with it one or more software components that may be executed in connection with a browser application by a computing device. For example, a web page area, such as recommended search query area 120, may be associated with one or more software components that may formulate recommended search queries for a specified use and/or particular user, in an embodiment without necessarily requiring user action, for example, such as by automation (e.g., automatically). For example, as mentioned previously, a web page, such as example web page 100, may be generated based, at least in part, on a web page template that may be coded using one or more markup languages, such as, for example, HTML and/or XML. Additionally, an area of a web page template, such as recommended search query area 120, may comprise code, such as JavaScript, for example, that may be executed by a computing device to generate a set of recommended search queries, in an embodiment. Such code may be executed at least in part in response to a user browsing to a web page, such as web page 100, for example.

As mentioned previously, an area of a web page, such as area 120, may be utilized in more than a single web page. For example, an area, such as area 120, may be incorporated into example web page 100, and may also be incorporated into another web page, such as example search results page 300, in an embodiment. Also, in an embodiment, an area, such as recommended search query area 120, may be associated with one or more particular users, and may, for example, follow the users to one or more web sites visited by the users.

Also, in an embodiment, recommended search query area 120 may be updated with additional and/or different recommended search queries and/or content, such as digital content, for example. Thus, as an example, at least in part in response to a user selecting one or more recommended search queries, and/or at least in part in response to other user browsing behavior, one or more additional and/or different recommended search queries and/or consumable content may be generated, in an embodiment. Also, in an embodiment, additional and/or different recommended search queries may be generated, displayed and/or otherwise executed at least in part in response to additional content, such as digital content, being gathered from other user search behavior, for example.

Figure 4:
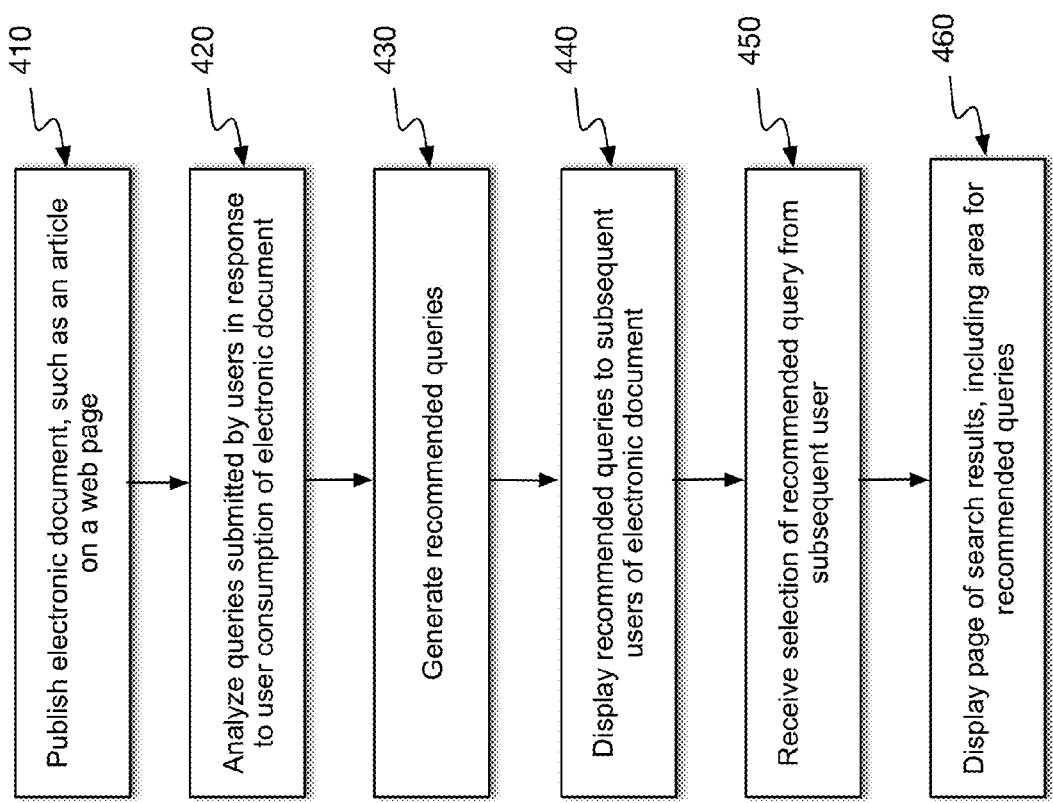
FIG. 4 is a schematic diagram illustrating an example process for search query recommendation formulation, according to an embodiment.

FIG. 4 is a schematic diagram illustrating an example process for search query recommendation formulation, according to an embodiment. In an embodiment, an electronic document, such as, for example, a news article, may be published. In an embodiment, an electronic document may be published on a web page, such as web page 100, for example, as depicted at block 410. Also, in an embodiment, one or more queries submitted by one or more users may be analyzed at least in part in response to a publication of an electronic document, as depicted at block 420. Also, as depicted at block 430, a plurality of recommended search queries may be generated, in an embodiment. For example, a plurality of recommended search queries may be generated based at least in part on one or more search queries submitted by one or more users.

In an embodiment, one or more early users consuming an electronic document may submit one or more search queries at least in part in response to consumption of content, and these one or more search queries from one or more early content users may be utilized to generate one or more recommended search queries for one or more later content users, for example. As used herein, the term "early user" refers to a user that consumes content, such as, for example, viewing at least a portion of an electronic document, such as via a web page, within a specified period of time, such as, for example, a specified period of time following publication of the content. For example, in an embodiment, an early content user may comprise a user that views a particular electronic document within two hours after publication, although, again, claimed subject matter is not limited in scope in these respects. For example, other types of content may be involved, such as images, audio, video, etc.

Further, as depicted at block 440 of FIG. 4, one or more of a plurality of recommended queries may be displayed to one or more subsequent users, in an embodiment. For example, one or more recommended queries generated from searching activities by early users may be displayed to one or more later users. As used herein, the term "later users" refers to users that may view and/or otherwise consume content during a time period other than an "early user" time period. For example, in an embodiment, an "early user" time period may comprise an initial time period that may begin approximately at content publication and that may extend a specified length of time. Also, in an embodiment, "later user" may refer to users that may view and/or otherwise consume published content after expiration of an "early user" time period, although again, claimed subject matter is not limited in scope in this respect. In an embodiment, a user may comprise an "early user" as compared to one or more other users, and/or may comprise a "later user" as compared with one or more additional users, for example.

In an embodiment, analyzing one or more queries submitted by one or more users, such as submitted by early users, for example, at least in part in response to publication of content, may include selecting one or more users based at least in part on a determination that respective users have accessed content, such as an electronic document. Also, in an embodiment, analyzing one or more queries may include monitoring search queries submitted by selected one or more users, such as submitted by one or more early users. Additionally, in an embodiment, selecting one or more users based at least in part on a determination that respective users have accessed content, such as an electronic document, may include selecting one or more users based at least in part on a determination that respective users have accessed content, such as an electronic document, within a specified period of time. In an embodiment, a specified period of time may begin approximately at publication and may extend approximately a specified length of time. In an embodiment, a specified length of time may comprise two hours, although claimed subject matter is not limited in scope to illustrations. Further, in an embodiment, monitoring search queries submitted by selected users, such as submitted by one or more early users, may include monitoring search queries submitted by selected users during a specified period of time, such as two hours in this example.

Also, in an embodiment, generating a plurality of recommended queries based at least in part on queries submitted by one or more users, such as by one or more early users, may include selecting one or more users based, at least in part, on one or more demographic attributes of respective users and/or on one or more browsing behaviors of respective users. Generation of recommended queries may further be based, at least in part, on frequencies of occurrence of various search queries among various early users, for example. Also, in an embodiment, generation of recommended queries may be based, at least in part, on relevance of a query to content, such as an electronic document, as explained more fully, below.

As further depicted at block 450 of FIG. 4, a selection of one or more recommended queries may be received from a subsequent user, such as from a later user, for example. At least in part in response to receiving a selection of a recommended query from a subsequent user, a search page may be displayed, as depicted at block 460. In an embodiment, as described previously, a search page may include an area to display a plurality of recommended queries. Thus, in an embodiment recommended queries may follow a subsequent user, such as from a web page, for example, to a search results page, thereby providing a subsequent user ready access to recommended queries to facilitate additional searching, if desired.

Embodiments in accordance with claimed subject matter may include all of blocks 410-460, more than blocks 410-460, and/or fewer than blocks 410-460. Further, the order of blocks 410-460 depicted in FIG. 4 is merely an example order, and claimed subject matter is not limited in scope in this respect.

Figure 5:
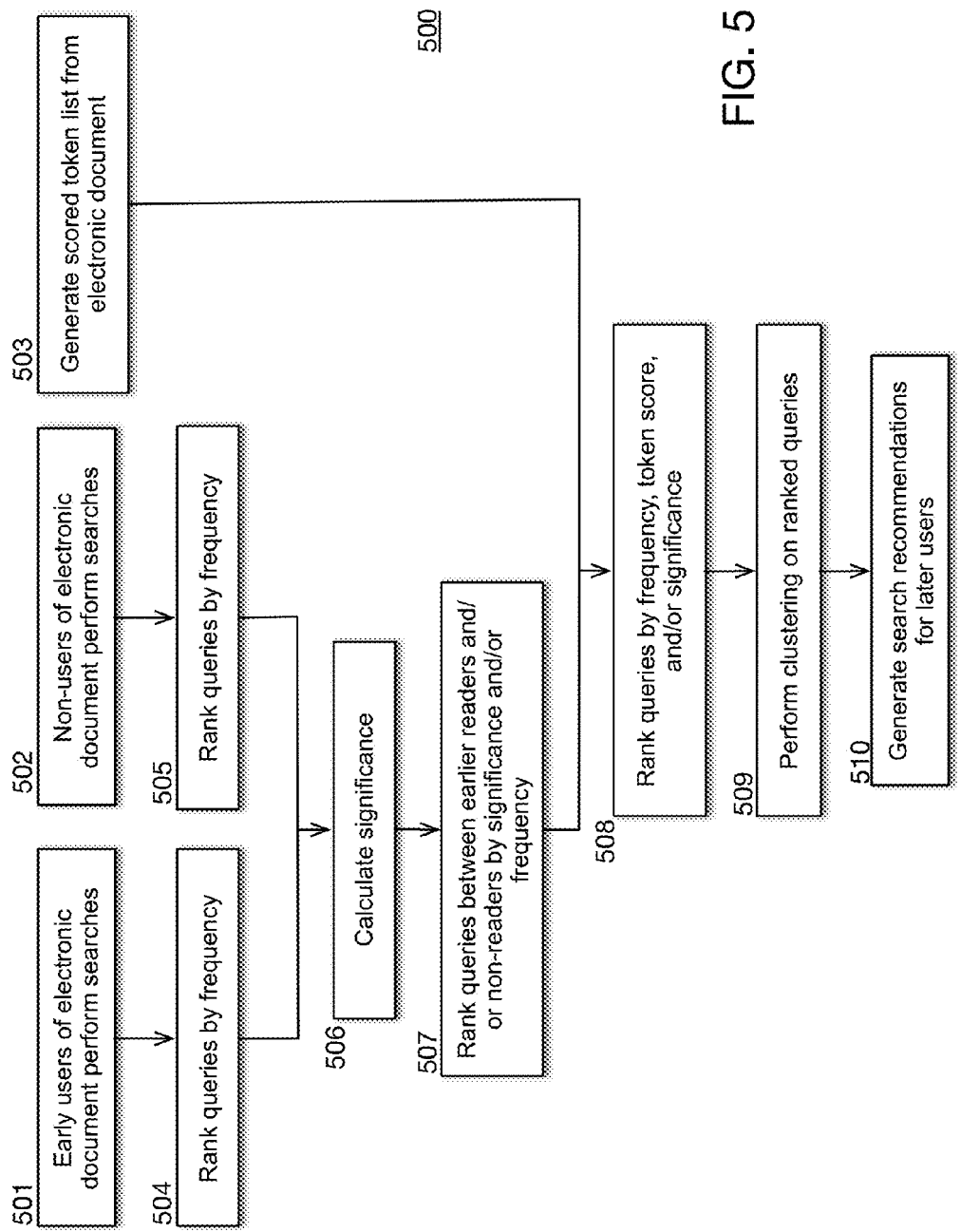
FIG. 5 is a schematic diagram illustrating an example process for search query recommendation formulation, according to an embodiment.

FIG. 5 is a schematic diagram illustrating an example process 500 for search query recommendation formulation, according to an embodiment. In an embodiment, early users, such as users who access an electronic document, may formulate queries and may perform searches at least in part in response to consuming, such as viewing, content, as depicted at block 501. Search queries from early users may be ranked, as depicted at block 504. In an embodiment, queries may be ranked, at least in part, according to frequency of occurrence among various earlier users, for example.

As also depicted at block 502 of FIG. 5, non-users may also formulate search queries and/or may perform searches. As used herein, the term "non-user" refers to a user that has not consumed specified content, such as an electronic document, for example. Also, as depicted at block 505, search queries submitted by non-users may also be ranked, at least in part, according to frequency of occurrence.

Additionally, as depicted at block 506, a significance in difference in frequency of occurrence between queries submitted by early users and queries submitted by non-users may be calculated by any one of a host different approaches. Claimed subject matter is not intended to be limited to a particular approach; however, an illustrative example is provided. For example, a significance score "S" may be calculated substantially in accordance with the following expression:

$$S = \frac{\left(\frac{k2}{n2}\right) - \left(\frac{k1}{n1}\right)}{\frac{\sqrt{k1}}{n1} + \frac{\sqrt{k2}}{n2}} \quad (1)$$

wherein n1 represents a count of instances of queries submitted by non-users, wherein n2 represents a count of instances of queries submitted by early users, wherein k1 represents a count of occurrences for a particular query submitted by non-users, and wherein k2 represents a count of occurrences for the particular query submitted by early users, in an embodiment. Also, in an embodiment, search queries may be ranked at least in part in accordance with respective significance scores and/or at least in part in accordance with respective frequencies of occurrence, as depicted, for example, at block 507.

In an embodiment, search queries may also be evaluated and/or analyzed for relevance to content, such as of a specified electronic document, for example. Thus, in an embodiment, term frequency-inverse document frequency (TFIDF) techniques may be utilized to evaluate a query for relevance, although other approaches to relevance are also intended to be included within claimed subject matter. In an embodiment, as depicted at block 503 of FIG. 5, for example, a list of tokens may be generated from an electronic document. In an embodiment, a token list may be scored using TFIDF techniques. For example, in an embodiment, text from queries and from an electronic document may be represented as a "bag of words". That is, text from an electronic document may be represented as multi-dimensional vectors having individual dimensions based at least in part on frequency of tokens and/or terms in an electronic document. Also, in an embodiment, a token score may be inversely related to a frequency of tokens in a specified corpus of electronic documents, otherwise referred to as "inverse document frequency."

Additionally, in an embodiment, token scores may also be weighted based at least in part on respective individual locations within an electronic document, and/or may be weighted based at least in part on token length and/or capitalization, and so forth. Further, tokens may be generated through synonym analysis and/or anaphora resolution, for example, in addition to being directly extracted from text, in an embodiment. Also, in an embodiment, relevance between a query and content, such as an electronic document, may be assessed by comparing, for example, a deviation of angles between a bag-of-words vector representing a query and a bag-of-words vector representing content. See, for example, "*Learning to Classify Text Using Support Vector Machines*", by Thorsten Joachims, [Kluwer Academic Publishers, February 2001], although claimed subject matter is not limited in scope in these respects.

As depicted at block 508 of FIG. 5, queries, such as those submitted by early users, as depicted at block 501, for example, may be ranked at least in part according to frequency of occurrence, token score, and/or significance score. For example, queries may be sorted and/or ranked by a combination of frequency, significance score, and/or relevance. Top-ranking queries may be collected to form a set of recommended search queries, for example, as depicted at block 510. In an embodiment, a set of recommended search queries may be presented to a user, as described previously.

In an embodiment, in preparation for selecting a set of recommended search queries, candidate queries may be clustered to remove duplicates and/or near-duplicates, as depicted at block 509. In an embodiment, clustering may be accomplished through a k-means clustering process, such as based at least in part on bag-of-words vectors, for example. Also, clustering may be performed at least in part in response to a ranking and selection of a set of high-ranking queries, for example. In another embodiment, clustering may be performed in preparation for ranking. At least in part in response, therefore, clusters may be ranked in an embodiment. For example, clusters may be ranked at least in part by summing frequencies of queries within individual clusters and/or by combining significance and/or relevance scores of queries within individual clusters to yield cluster scores, in an embodiment. At least in part in response to a clustering operation, queries may be selected from different clusters to potentially improve diversity among a set of recommended search queries, in an embodiment.

In an embodiment, human editors may select a set of recommended search queries from a set of highly-ranking candidate queries generated by example ranking operations, such as described above. Similarly, clustering may be used to organize candidate queries, to help editors select a diverse set of suggested follow-on queries by selecting them from different clusters. In other embodiments, human editors may not necessarily be involved in selecting a set of recommended search queries. Rather, in one or more embodiments, recommended search queries may be generated without human intervention, for example, via automation.

Figure 6:
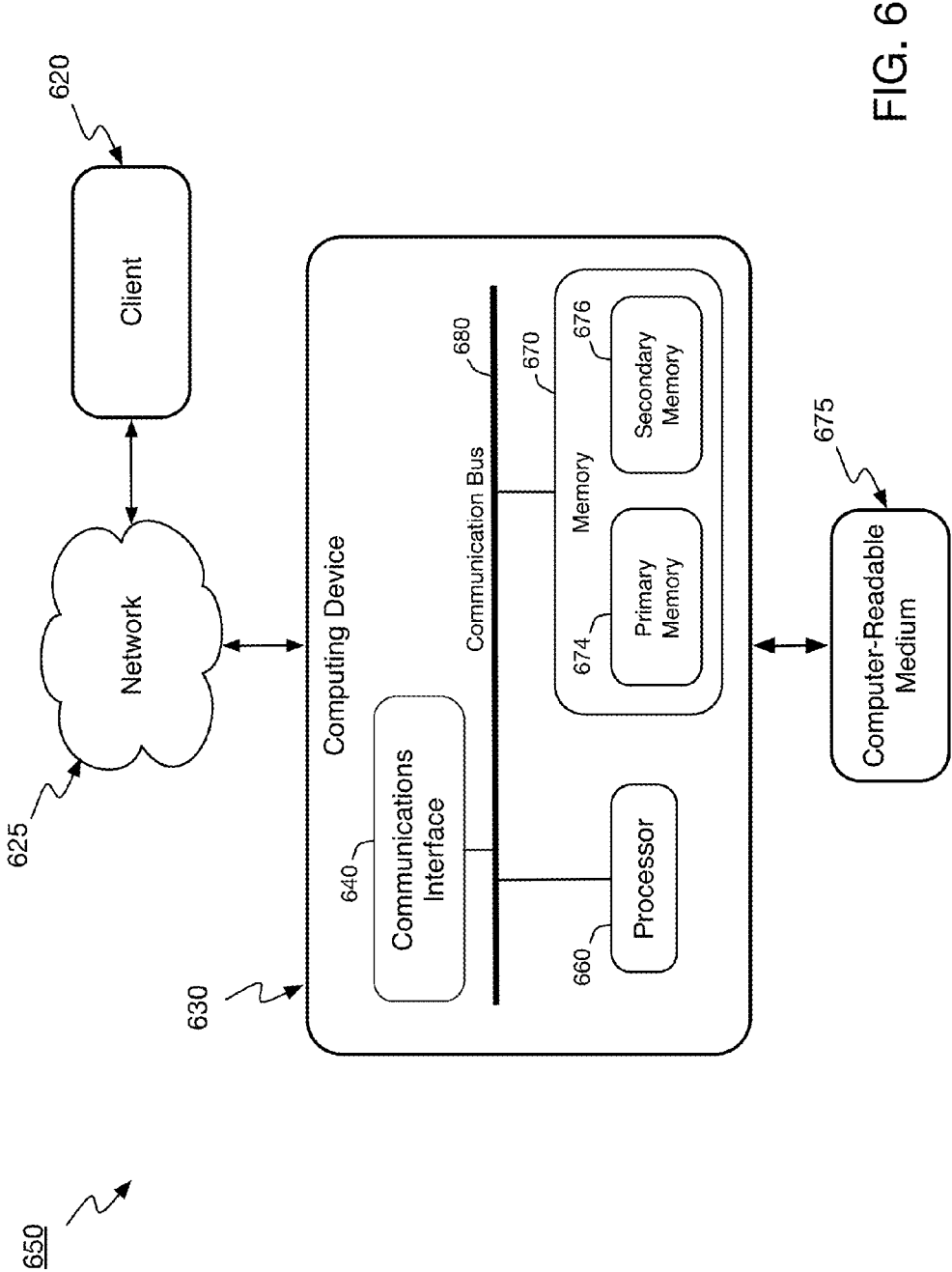
FIG. 6 is a schematic diagram illustrating an example computing device in accordance with an embodiment.

For purposes of illustration, FIG. 6 is an illustration of an embodiment of a system 650 that may be employed in a client-server type interaction, such as described infra. in connection with rendering a GUI via a device, such as a network device and/or a computing device, for example. In FIG. 5, computing device 630 may interface with client 620, which may comprise features of a client device, for example. Communications interface 640, processor (e.g., processing unit) 660, and memory 670, which may comprise primary memory 674 and secondary memory 676, may communicate by way of communication bus 680, for example. In FIG. 6, client 620 may represent one or more sources of analog, uncompressed digital, lossless compressed digital, and/or lossy compressed digital formats for content of various types, such as video, imaging, text, audio, etc. in the form physical states and/or signals, for example. Client 620 may communicate with computing platform 630 by way of an Internet connection via network 625, for example. Although the computing device of FIG. 6 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 660 may be representative of one or more circuits, such as digital circuits, to perform at least a portion of a computing procedure and/or process. By way of example, but not limitation, processor 660 may comprise one or more processors, such as controllers, microprocessors, microcontrollers, application specific integrated circuits, digital signal processors, programmable logic devices, field programmable gate arrays, the like, or any combination thereof. In implementations, processor 660 may perform signal processing to manipulate signals and/or states, to construct signals and/or states, etc., for example.

Memory 670 may be representative of any storage mechanism. Memory 670 may comprise, for example, primary memory 674 and secondary memory 676, additional memory circuits, mechanisms, or combinations thereof may be used. Memory 670 may comprise, for example, random access memory, read only memory, etc., such as in the form of one or more data storage devices and/or systems, such as, for example, a disk drive, an optical disc drive, a tape drive, a solid-state memory drive, etc., just to name a few examples. Memory 670 may be utilized to store a program. Memory 670 may also comprise a memory controller for accessing computer readable-medium 675 that may carry and/or make accessible content, which may include code, and/or instructions, for example, executable by processor 660 and/or some other unit, such as a controller and/or processor, capable of executing instructions, for example.

Under direction of processor 660, memory, such as memory cells storing physical states, representing, for example, a program, may be executed by processor 660 and generated signals may be transmitted via the Internet, for example. Processor 660 may also receive digitally-encoded signals from client 620.

Network 625 may comprise one or more network communication links, processes, services, applications and/or resources to support exchanging communication signals between a client, such as 620, and computing platform 630, which may, for example, comprise one or more servers (not shown). By way of example, but not limitation, network 625 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store data in the form of signals and/or states. Thus, a computing device, in this context, may comprise hardware, software, firmware, or any combination thereof (other than software per se). Computing device 630, as depicted in FIG. 6, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, wearable technology, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 670 may store cookies relating to one or more users and may also comprise a computer-readable medium that may carry and/or make accessible content, including code and/or instructions, for example, executable by processor 660 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets, such as in a network of participating digital communications, A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such physical signals and/or physical states as bits, data, values, elements, symbols, characters, terms, numbers, numerals, information, and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, systems and/or configurations were set forth to provide an understanding of claimed subject matter. However, claimed subject matter may be practiced without those specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method, comprising:
processing, utilizing at least one processor of a server computing device, signals obtained from a plurality of user computing devices to analyze one or more queries submitted by one or more consumers of particular digital content;
generating, at the server computing device, one or more signal packets representative of one or more selectable recommended queries based at least in part on the one or more queries submitted by the one or more consumers of the particular digital content;
transmitting the one or more signal packets representative of the one or more selectable recommended queries from the server computing device to an additional user computing device for display of the one or more selectable recommended queries to a subsequent user in connection with consumption by the subsequent user of the particular digital content; and
transmitting to the additional user computing device the one or more signal packets representative of the one or more selectable recommended queries for display of the one or more selectable recommended queries on the additional user computing device in connection with consumption by the subsequent user of additional digital content such that the one or more selectable recommended queries appear to the subsequent user to follow the subsequent user as the subsequent user transitions from consuming the particular digital content to consuming the additional digital content.

2. The method of claim 1, further comprising:
prior to the processing the signals obtained from the plurality of user computing devices, identifying, utilizing the at least one processor of the server computing device, the one or more consumers of the particular digital content based at least in part on a determination that the one or more consumers of the particular digital content have accessed the particular digital content; and
monitoring search queries submitted by the one or more consumers of the particular digital content.

3. The method of claim 2, wherein the identifying the one or more consumers of the particular digital content comprises selecting the one or more consumers of the particular digital content based at least in part on a determination that the one or more users consumers of the particular digital content have accessed the particular digital content within a specified period of time.

4. The method of claim 3, wherein the specified period of time comprises a period of time beginning approximately at publication of the particular digital content and extending approximately a specified length of time.

5. The method of claim 2, wherein the monitoring the search queries submitted by the one or more consumers of the particular digital content comprises monitoring search queries submitted by the one or more consumers of the particular digital content during a specified period of time.

6. The method of claim 1, further comprising:
prior to the processing the signals obtained from the plurality of user computing devices, identifying one or more non-consumers of the particular digital content based, at least in part, on one or more demographic attributes and/or one or more browsing behaviors; wherein the generating the one or more selectable recommended queries is further based, at least in part, on one or more queries submitted by the one or more non-consumers of the particular digital content.

7. The method of claim 6, wherein the processing includes ranking the one or more queries submitted by the one or more consumers of the particular digital content and the one or more queries submitted by the one or more non-consumers of the particular digital content based at least in part on a difference in frequency of occurrence between the one or more queries submitted by the one or more consumers of the particular digital content and the one or more queries submitted by the one or more non-consumers of the particular digital content.

8. The method of claim 1, wherein the additional digital content comprises a search page.

9. The method of claim 1, wherein the particular digital content comprises a web page.

10. An article, comprising: a non-transitory storage medium having stored thereon instructions executable by a computing device to:
process signals obtained from a plurality of user computing devices to analyze one or more queries submitted by one or more consumers of particular digital content;
generate one or more signal packets representative of one or more selectable recommended queries based at least in part on the one or more queries submitted by said one or more consumers of the particular digital content;
transmit the one or more signal packets representative of the one or more selectable recommended queries to an additional user computing device for display of the one or more selectable recommended queries to a subsequent user in connection with consumption by the subsequent user of the particular digital content; and
transmit to the additional user computing device the one or more signal packets representative of the one or more selectable recommended queries for display of the one or more selectable recommended queries on the additional user computing device in connection with consumption by the subsequent user of additional digital content such that the one or more selectable recommended queries appear to the subsequent user to follow the subsequent user as the subsequent user transitions from consuming the particular digital content to consuming the additional digital content.

11. The article of claim 10, wherein the storage medium having stored thereon further instructions executable by the computing device to:
prior to the process of the signals obtained from the plurality of user computing devices, identify the one or more consumers of the particular digital content based at least in part on a determination that the one or more consumers of the particular digital content have accessed the particular digital content; and
monitor search queries submitted by the one or more consumers of the particular digital content.

12. The article of claim 11, wherein the storage medium having stored thereon further instructions executable by the computing device to identify the one or more consumers of the particular digital content based at least in part on a determination that the one or more consumers of the particular digital content have accessed the particular digital content within a specified period of time.

13. The article of claim 12, wherein the specified period of time comprises a period of time beginning approximately at publication of the particular digital content and extending approximately a specified length of time.

14. The article of claim 11, wherein the storage medium having stored thereon further instructions executable by the computing device to monitor the search queries submitted by the one or more consumers of the particular digital content during a specified period of time.

15. The article of claim 10, wherein the storage medium having stored thereon further instructions executable by the computing device to: prior to the process of the signals obtained from the plurality of user computing devices, identify one or more non-consumers of the particular digital content based, at least in part, on one or more demographic attributes and/or one or more browsing behaviors, wherein the generation of the one or more selectable recommended queries is further based, at least in part, on one or more queries submitted by the one or more non-consumers of the particular digital content.

16. The article of claim 15, wherein, to process the signals obtained from the plurality of user computing devices, the storage medium having stored thereon further instructions executable by the computing device to:
rank the one or more queries submitted by the one or more consumers of the particular digital content and the one or more queries submitted by the one or more non-consumers of the particular digital content based at least in part on a difference in frequency of occurrence between the one or more queries submitted by the one or more consumers of the particular digital content and the one or more queries submitted by the one or more non-consumers of the particular digital content.

17. The article of claim 1, wherein the additional digital content to comprise a search page.

18. The article of claim 10, wherein particular digital content comprises a web page.

19. An apparatus, comprising: at least one processor to:
process signals obtained from a plurality of user computing devices to analyze one or more queries submitted by one or more consumers of particular digital content;
generate one or more signal packets representative of one or more selectable recommended queries based at least in part on the one or more queries submitted by said one or more consumers of the particular digital content;
transmit the one or more signal packets representative of the one or more selectable recommended queries to an additional user computing device for display of the one or more selectable recommended queries to a subsequent user in connection with consumption by the subsequent user of the particular digital content; and
transmit to the additional user computing device the one or more signal packets representative of the one or more selectable recommended queries for display of the one or more selectable recommended queries on the additional user computing device in connection with consumption by the subsequent user of additional digital content such that the one or more selectable recommended queries appear to the subsequent user to follow the subsequent user as the subsequent user transitions from consuming the particular digital content to consuming the additional digital content.

20. The apparatus of claim 19, wherein the at least one processor further to:
prior to the process of the signals obtained from the plurality of user computing devices, identify the one or more consumers of the particular digital content based at least in part on a determination that the one or more consumers of the particular digital content have accessed the particular digital content; and
monitor search queries submitted by the one or more consumers of the particular digital content.

21. The apparatus of claim 20, wherein the at least one processor to identify the one or more consumers of the particular digital content based at least in part on a determination that the one or more consumers of the particular digital content have accessed the particular digital content within a specified period of time.

22. The apparatus of claim 21, wherein the specified period of time comprises a period of time beginning approximately at publication of the particular digital content and extending approximately a specified length of time.

23. The apparatus of claim 20, wherein, to monitor the search queries, the at least one processor to monitor the search queries submitted by the one or more consumers of the particular digital content during a specified period of time.

24. The apparatus of claim 19, wherein prior to the process of the signals obtained from the plurality of user computing devices, the at least one processor to identify one or more non-consumers of the particular digital content based, at least in part, on one or more demographic attributes and/or one or more browsing behaviors, wherein the at least one processor to generat the one or more selectable recommended queries based, at least in part, on one or more queries submitted by the one or more non-consumers of the particular digital content.

25. The apparatus of claim 24, wherein, to process the signals obtained from the plurality of user computing devices, the at least one processor further to rank the one or more queries submitted by the one or more consumers of the particular digital content and the one or more queries submitted by the one or more non-consumers of the particular digital content based at least in part on a difference in frequency of occurrence between the one or more queries submitted by the one or more consumers of the particular digital content and the one or more queries submitted by the one or more non-consumers of the particular digital content.

26. The apparatus of claim 1,
wherein the additional digital content to comprise a search page.

27. The apparatus of claim 19, wherein particular digital content comprises a web page.

* * * * *